United States Patent
Tao et al.

(10) Patent No.: US 6,879,705 B1
(45) Date of Patent: Apr. 12, 2005

(54) METHOD AND APPARATUS FOR TRACKING MULTIPLE OBJECTS IN A VIDEO SEQUENCE

(75) Inventors: Hai Tao, Plainsboro, NJ (US); Rakesh Kumar, Monmouth Junction, NJ (US); Harpreet Singh Sawhney, W. Windsor, NJ (US)

(73) Assignee: Sarnoff Corporation, Princeton, NJ (US)

( * ) Notice: Subject to any disclaimer, the term of this patent is extended or adjusted under 35 U.S.C. 154(b) by 573 days.

(21) Appl. No.: 09/615,971

(22) Filed: Jul. 14, 2000

Related U.S. Application Data
(60) Provisional application No. 60/143,750, filed on Jul. 14, 1999.

(51) Int. Cl.$^7$ .................................................. G06K 9/00
(52) U.S. Cl. ..................................................... 382/103
(58) Field of Search ................................. 382/103, 160, 382/190, 206; 348/135, 169, 208.14; 342/76, 96, 99, 101, 197, 337.07; 340/539.13; 345/621, 625, 630, 632; 700/29, 31

(56) References Cited

U.S. PATENT DOCUMENTS

| | | | | |
|---|---|---|---|---|
| 5,379,044 A | * | 1/1995 | Carlson et al. | 342/90 |
| 5,406,289 A | * | 4/1995 | Barker et al. | 342/96 |
| 5,631,653 A | * | 5/1997 | Reedy | 342/62 |
| 5,761,326 A | * | 6/1998 | Brady et al. | 382/103 |
| 6,031,568 A | * | 2/2000 | Wakitani | 348/169 |
| 6,353,679 B1 | * | 3/2002 | Cham et al. | 382/228 |
| 6,542,621 B1 | * | 4/2003 | Brill et al. | 382/103 |

OTHER PUBLICATIONS

Isard et al. "Icondensation: Unifying Low–Level and High–Level Tracking in a Stochastic Framework", Department of Engineering Science, University of Oxford, pp. 893–908.

Rabiner, Lawrence R., "A Tutorial on Hidden Markov Models and Selected Applications in Speech Recognition", Proceedings of the IEEE, vol. 77, No. 2, pp. 257–286, Feb. 1989.

Reid, Donald B., "An Algorithm for Tracking Multiple Targets" IEEE Transactions on Automatic Control, vol. AC–24, No. 6, pp. 843–854, Dec. 1979.

Isard et al. "Contour Tracking by Stochastic Propagation of Conditional Density" In Proc. European Conf. Computer Vision, pp. 343–356, Cambridge, UK, 1996.

Ghahramani et al. "Parameter Estimation for Linear Dynamical Systems" Department of Computer Science, University of Toronto, Technical Report CRG–TR–96–2, pp. 1–6, Feb. 22, 1996.

Cox et al. "An Efficient Implementation of Reid's Multiple Hypothesis Tracking Algorithm and Its Evaluation for the Purpose of Visual Tracking" IEEE Trans. on Pattern Analysis and Machine Intell., vol. 18, No. 2, pp. 138–150, Feb. 1996.

* cited by examiner

*Primary Examiner*—Andrew W. Johns
*Assistant Examiner*—Shervin Nakhjavan
(74) *Attorney, Agent, or Firm*—William J. Burke

(57) ABSTRACT

A method and apparatus for tracking multiple objects in a video sequence. The method defines a group of objects as a configuration, selects a configuration for a current video frame, predicts a configuration using a two-level process and computes the likelihood of the configuration. Using this method in an iterative manner on a sequence of frames, tracks the object group through the sequence.

17 Claims, 3 Drawing Sheets

METHOD AND APPARATUS FOR TRACKING MULTIPLE OBJECTS IN A VIDEO SEQUENCE

This application claims benefit of U.S. provisional application Ser. No. 60/143,750 filed Jul. 14, 1999.

This invention was made with U.S. government support under contract no. DAAB07-98-C-J023. The U.S. government has certain rights in this invention.

The invention relates to image processing systems and, more particularly, the invention relates to image processing systems that detect and track objects.

BACKGROUND OF THE DISCLOSURE

Tracking of multiple objects in video is a key issue in many applications including video surveillance, human computer interaction, and video conferencing. Multiple object tracking has also become a challenging research topic in computer vision. Some difficult issues involved are the handling of cluttered background, unknown number of objects, and complicated interactions between objects within a scene. Most tracking algorithms compute the a posteriori probability of object states and adopt a probabilistic hidden Markov model (HMM) to track objects in a video sequence.

As shown in FIG. 1, the states of an object at different time instances $x_t \epsilon X$, t=1,2, . . . n, form a Markov chain. State $x_t$ belongs to the parameter space X that may contain parameters such as the position, scale factor, or deformation parameters of the object. At each time instance t, conditioned on $x_t$, the observation $z_t$ is independent of other object states or observations. Observations can be some observed variables representing objects in an image or the image itself. This model is summarized as:

$$P(x_1, x_2, \ldots x_n; z_1, z_2, \ldots, z_n) = P(x_1)P(z_1|x_1) \prod_{t=2}^{n} [P(x_t|x_{t-1})P(z_t|x_t)] \quad (1)$$

The object tracking problem can be posed as the computation of the a posteriori distribution $P(x_t|Z_t)$ given observations $Z_t = \{Z_1, Z_2, \ldots, Z_t\}$. When a single object is tracked, the maximum a posteriori (MAP) solution is desired. When both the object dynamics $P(x_t|x_{t-1})$ and observation likelihood $P(z_t|x_t)$ are Gaussian, $P(x_t|Z_t)$ is also Gaussian and the MAP solution is $E(x_t|Z_t)$.

To compute $P(x_t|Z_t)$ for HMM, a forward algorithm can be applied. The forward algorithm computes $P(x_t|Z_t)$ based on $P(x_{t-1}|Z_{t-1})$ in an inductive manner and is formulated as $$P(x_t|Z_t) \propto P(z_t|x_t)P(x_t|Z_{t-1}) = P(z_t x_t) \int P(x_t|x_{t-1})P(x_{t-1}|Z_{t-1}) dx_{t-1} \quad (2)$$

Using this formula, a well-known Kalman filter computes $E(x_t|Z_t)$ for a Gaussian process. When either $P(x_t|x_{t-1})$ or $P(z_t|x_t)$ is not in an analytic form, sampling algorithm techniques need to be applied to implement the forward algorithm. For the situation where $P(x_t|x_{t-1})$ is Gaussian and $P(z_t|x_t)$ is non-Gaussian, prior art object tracking algorithms have used a CONDENSATION algorithm. The CONDENSATION algorithm simulates $P(x_t|Z_t)$ with many samples and propagates this distribution through time by integrating the likelihood function $P(z_t|x_t)$ and the dynamics $P(x_t|x_{t-1})$. Alternatively, a variance reduction method within Monte Carlo approach, known as importance sampling, may also be applied to reduce the number of samples. The CONDENSATION algorithm converges to a single dominant peak in the posterior distribution. In its stated form, the CONDENSATION algorithm does not generalize to multi-object tracking.

When multiple objects are involved and the number of objects are known and fixed, an analytic-form tracker can use a Gaussian mixture model and Kalman filter for posterior density estimation. When the number of objects may change at any time, semi-analytic methods such as multiple-hypothesis tracking can be used. However, the complexity of this algorithm is exponential with respect to time and a pruning technique is necessary for practical reasons.

If $x_t$ is a parameter of an object, propagating distribution $P(x_t|Z_t)$ by sampling also has difficulty tracking multiple objects. According to Equation (2), $P(x_t|Z_t)$ is essentially the multiplication of dynamically changed and diffused version (by $P(x_{t+1}|x_t)$) of likelihood function $P(z_t|x_t)$. When the likelihood of an object is constantly larger or smaller than that of another object (in practice this happens quite often), the ratio between the a posteriori probabilities of these two objects increase exponentially with respect to t. If a fixed number of object samples are used, say a CONDENSATION-like algorithm, when t is larger than a certain value, only the object with the dominant likelihood is likely to be tracked. This phenomenon is illustrated in FIGS. 2A and 2B. When t=20, more than 3000 samples are needed to obtain a single sample from an object with a smaller likelihood. In this example, for convenience of computation, no blurring is considered, which is equivalent to $P(x_t|x_{t-1})=\delta(x_{t-1})$. Additionally, it is assumed that the object is not moving, which is also the case when the algorithm is applied to a single video frame. FIG. 2A depicts $P(x_1|z_1)$ having modes 202 and 204 and FIG. 2B depicts $P(x_{20}|Z_{20})=P(x_1|Z_1)^{20}$ having modes 206 and 208. Using a smoother $P(x_t|x_{t-1})$ will reduce the peak value ratio between the modes. However, the ratio of modes still increases exponentially with the number samples.

A conclusion from the above analysis is that as long as $P(x_t|Z_t)$ is approximated with samples whose total number increases less than exponentially with respect to number of iterations, the tracker will converge to the objects having the maximum likelihood. When the likelihood function is biased and one mode is always has higher likelihood value, the tracker can only track that object from frame to frame. When the forward algorithm is applied to the same image for many times, the object parameter with maximum likelihood can be found. In summary, the CONDENSATION algorithm converges to the dominant mode (208 in FIG. 2B) of the distribution and suppresses the rest (206 in FIG. 2B).

Therefore, a need exists in the art for a method and apparatus for tracking multiple objects within a sequence of video frames.

SUMMARY OF THE INVENTION

The present invention provides a method and apparatus for tracking multiple objects in a video sequence. The method defines a group of objects as a configuration, selects a configuration for a current video frame, predicts a configuration using a two-level process and computes the likelihood of the configuration. Using this method in an iterative manner on a sequence of frames, tracks the object group through the sequence.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention is a method and apparatus for tracking multiple objects in a video sequence of a scene. The invention is generally implemented as a software routine or routines that when executed by a processor will cause an image processing system to perform the steps of the invention. The invention may be implemented in software, hardware or a combination of software and hardware.

Figure 1:
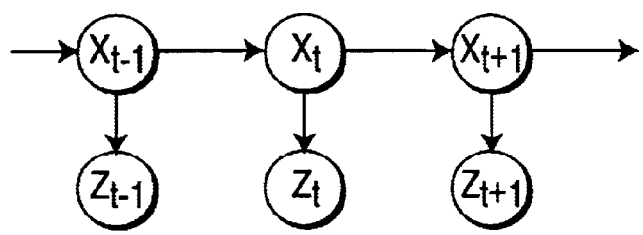
FIG. 1 depicts a hidden Markov model of the prior art.
Figure 2A:
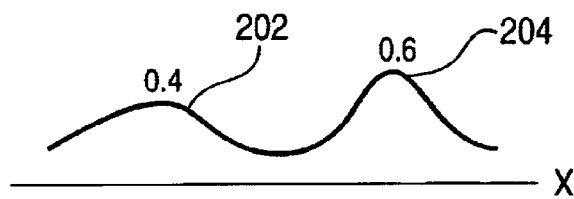
FIGS. 2A and 2B depict the results of using a CONDENSATION algorithm using a posterior probability.
Figure 2B:
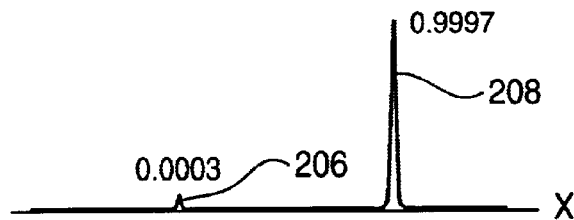
Figure 3:
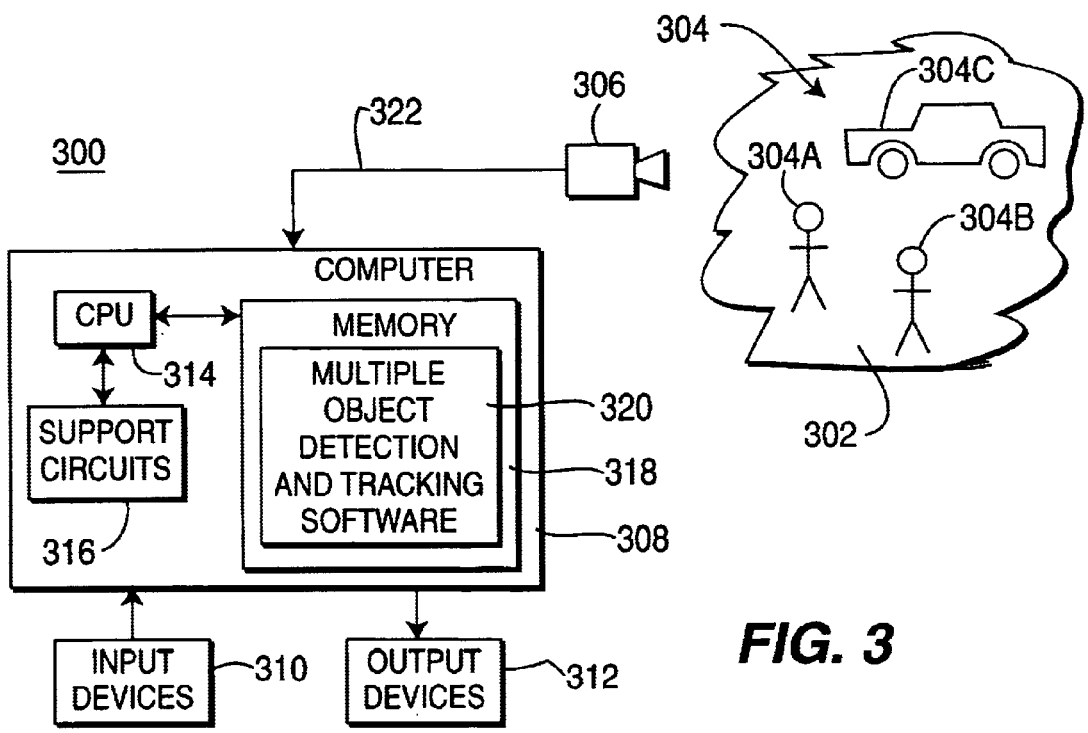
FIG. 3 depicts a block diagram of a computer system used to implement the present invention.

FIG. 3 depicts an image processing system 300 comprising at least one image sensor 306 (e.g., a video camera), a computer 308, input devices 310 and output devices 312. The sensor 306 is used to image a scene 302 comprising a plurality of moving objects 304A, 304B, and 304C (collectively objects 304). The sensor 306 produces a video signal on path 322 comprising a sequence of image frames. Until processed, the sequence is generally stored in the computer 308 or stored on a video storage device such as a video cassette recorder.

The computer 308 comprises a central processing unit (CPU) 314, support circuits 316 and memory 318. The CPU 314 may be any general purpose processor that, when executing the software of the present invention, forms a specific purpose processor; namely, an image processor. The support circuits 316 are well known devices and circuits that supplement the operation of the CPU 314 including cache, clocks, power supplies, buses, and the like. The memory 320 is random access memory, read only memory, removable storage, disk drives or any combination of these devices. The memory 320 stores the software 320 of the present invention. The input devices 310 may be a keyboard, mouse, trackball, and the like, while the output devices 312 may be a printer, display, and the like.

To track multiple objects 304, a plurality of objects are considered simultaneously. A collection of m objects is referred to as an object configuration (hereinafter the term "configuration" will be used for conciseness). The set of parameters of a configuration is $s_t = \{x_{t,1}, x_{t,2}, \ldots, x_{t,m}\} \in X^m$. When the number of the objects 304 is unknown, $s_t \in \cup_{m=0}^{K} X^m$, where K is the maximum possible number of objects in an image. To handle multiple objects, instead of propagating the a posteriori probability of object parameters $P(x_t|Z_t)$ the present invention propagates the a posteriori probability of the configuration parameters $P(s_t|Z_t)$. The forward propagation formula $$P(s_t|Z_t) \propto P(z_t|s_t)P(s_t|Z_{t-1}) = P(z_t|s_t) \int P(s_t|s_{t-1})P(s_{t-1}|Z_{t-1})ds_{t-1} \quad (3)$$

suggests the following algorithm using the sampling strategy of a CONDENSATION algorithm.

Figure 4:
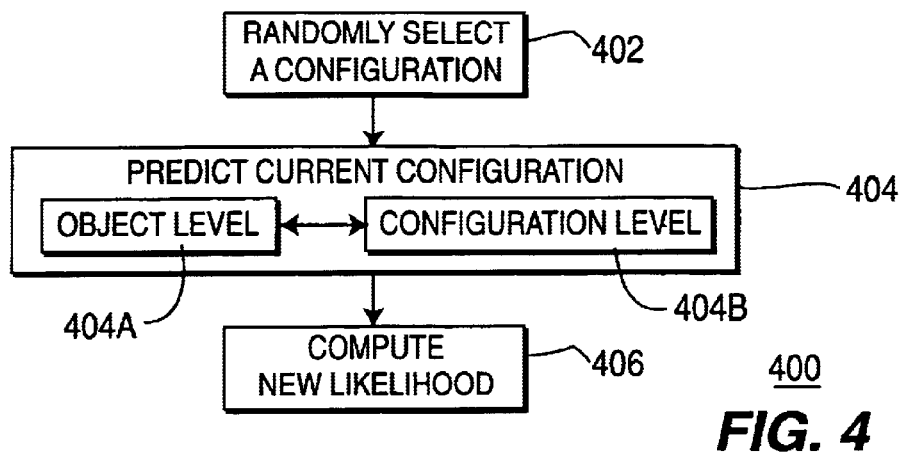
FIG. 4 depicts a flow diagram of a method representing a first embodiment of the invention.

FIG. 4 depicts a flow diagram of a method 400 of the present invention. Suppose $\pi_t^j = P(z_t|s_t^j), j=1,2, \ldots R_s$ is the likelihood of the jth configuration $s_t^j$. $R_s$ is the likelihood of the jth configuration $s_t^j$. $R_s$ is the total number of configuration samples, which is a constant in the algorithm. In each iteration (or frame), the three steps of the algorithm are:

Step 402. At time instance t>1, randomly select the jth configuration sample $s'_{t-1}{}^j$ from all $R_s$ samples $s_{t-1}{}^i$, i=1,2, ... $R_s$ in the previous frame according to their corresponding likelihood $\pi_{t-1}{}^i$, i=1,2, ... $R_s$.

Step 404. Apply the dynamics to predict current configuration $S_t^j$ from $s'_{t-1}{}^j$ using $$P(s_t^j|s'_{t-1}{}^j).$$

Step 406. Compute the new likelihood $$\pi_t^j = P(Z_t|S_t^j)$$

At the beginning of the iteration, step 402, $s_1^j$ is assigned randomly in configuration space $\cup_{m=0}^{K} X^m$. One way of doing this is to assign an equal number of configuration samples to given number of objects. For example, if the maximum possible number of objects is K=9 and the invention uses 1000 samples, $R_s=1000$, then 100 samples each are assigned to the 10 configurations containing 0 to 9 objects, separately. For configuration sample with m objects, the parameters for each object are, again, randomly chosen in the parameter space. The likelihood $\pi_1^j$ for sample $s_1^j$ is then computed. If the likelihood is high, according to Step 402, in the next iteration, this configuration is likely to be selected. The expected number of objects can also be computed as $\Sigma_{j=1}^{Rs}|s_t^j|\pi_t^j/\Sigma_{i=1}^{Rs}\pi_t^j$, where $|S_t^j|$ is the number of objects in $S_t^j$.

Two key issues in method 400 are how to compute the configuration dynamics $P(s_t^j|s'_{t-1}{}^j)$ and the configuration likelihood $P(z_t|s_t^j)$ describes the dynamic behavior of a configuration in terms of how each of individual object within a configuration changes from frame to frame, how a new object is introduced into a configuration, how an existing object is deleted from a configuration. Occlusions can also be accounted for using object introduction and deletion. The likelihood $P(z_t|s_t^j)$ represents, for a given configuration, how likely the observation of a particular configuration will occur. The most likely configuration is tracked from frame to frame.

Two levels of behaviors are described in $P(s_t^j|s'_{t-1}{}^j)$: object-level and configuration-level dynamics. Suppose $s'_{t-1}{}^j$ contains m objects, or $S'_{t-1}{}^j = \{x_{t-1,1}, x_{t-1,2}, \ldots, x_{t-1,m}\}$. Object-level dynamics $P(x_{t,1}|x_{t-1,t})$ describes the changes of individual objects over time. The configuration-level dynamics are responsible for deleting existing objects and adding new objects to a configuration. In step 404, these two levels of dynamics (404A and 404B) are performed sequentially in either order.

Object-level Dynamics $P(x_{t,t}|x_{t-1,t})$.

Object-level dynamics uses a model that is represented by $$x_{t,t} = Ax_{t-1,t} + w \quad (4)$$

where w: N(0,Σ) is Gaussian noise and A is the state transition matrix. According to this model, $P(x_{t,1}|x_t-1i)$ has Gaussian distribution $N(Ax_{t-1,i},\Sigma)$ and $x_{t,i}$ can be predicted accordingly.

Configuration-level Dynamics

The configuration-level dynamics allows deletion, addition of objects in configuration $s_t^j$. Domain-dependent information can also be used. If the scene background is static, knowledge about where object deletions and object additions might occur is described as a spatial birth and death Poisson process if the scene background is static. The object deletions and additions can also be built on a video mosaic image obtained from a camera in a fixed position.

Figure 5:
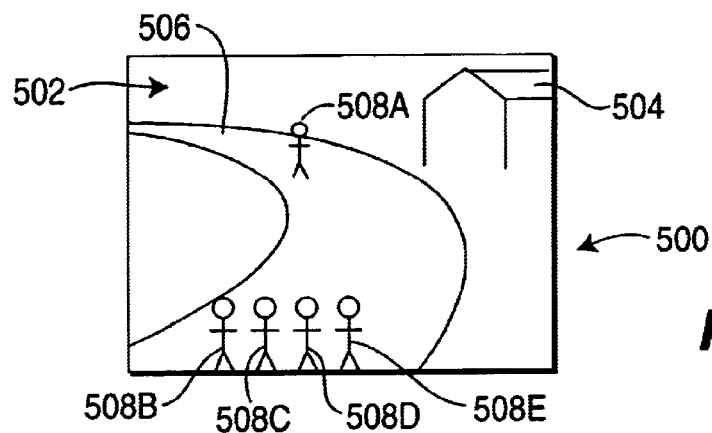
FIG. 5 depicts an illustrative video frame upon which the invention may operate.

FIG. 5 depicts a frame of video 500 comprising a background scene 502 (e.g., a house 504 and a sidewalk 506) and a plurality of objects 508A–E of interest (e.g., moving objects).

Figure 6:
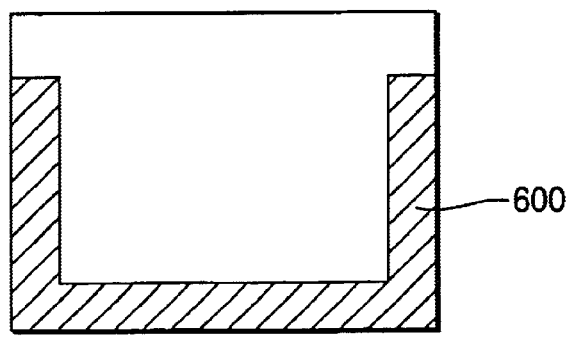
FIG. 6 depicts an illustrative deletion map for the frame of FIG. 5.

Depending on the image coordinates (x,y) of an object, an object has a deletion probability $\beta(x,y)$. For example, if an object is very close to the boundary of the image, or there is a door in the image, those places should have higher $\beta$, i.e., objects near a boundary are likely to leave the scene and thus require deletion. The same is true for objects that are near a door within a scene. If there is no such information available, a constant $\beta$ can be used. In this case, for a configuration with m objects, the probability of no objects getting deleted is $(1-\beta)^m$. It can be seen that when occlusions happen in an area with low deletion probability, a configuration will maintain its number of objects. FIG. 6 shows a region 600 of an increased deletion probability (deletion map) positioned near the image edge for the image of FIG. 5.

Figure 7:
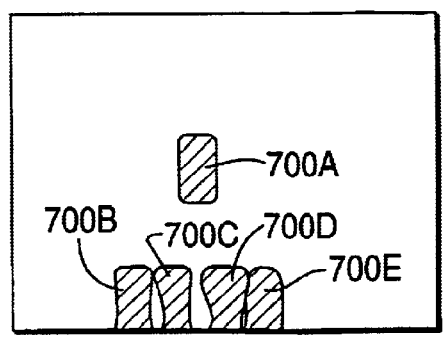
FIG. 7 depicts an illustrative foreground blob model for the frame of FIG. 5.

For each object configuration, a fixed probability $\alpha$ is also assigned for object addition to the configuration. The parameter of a new object should be sampled randomly from object parameter space. If some a priori knowledge is available about where a new object may appear, the new object can be sampled according to this prior knowledge. For example, "foreground blobs" are extracted during pre-processing to identify foreground objects that generally comprise the objects to be tracked, the new objects are added only to those areas, i.e., areas where new objects enter the scene. FIG. 7 depicts a plurality of foreground blobs 700A–E that correspond to the image of FIG. 5. The "foreground blobs" can be formed using well-known processes such as background subtraction, a two-image difference technique, a three-image difference technique and the like.

Likelihood of Configuration

Again, there are object-level and configuration-level likelihood for configuration $s_t^j$. The object-level likelihood $P(z_t|X_{t,i})$ measures how well the observations fit the object parameters. If only likelihood of this level is considered, the configuration that gives maximum likelihood will be the one with all objects located at the one position that has the maximum object likelihood. Configuration-level likelihood is introduced to avoid this errant situation by forcing a configuration to explain all the observed data with minimum number of objects (cost). For example, the invention locates model objects at positions that cover more foreground blob area. A good configuration should try to explain as much interested region (foreground blob) as possible with lowest cost and highest object likelihood.

Likelihood of Individual Object $P(z_t|x_{t,i})$ $P(z_t|x_{t,i})$ is the likelihood of an individual object which could simply be normalized correlation between a transformed object template and the video frame, or a Chamfer matching score for a contour tracker. The likelihood of all m objects in configuration $s_t^j$ is the geometric average of all $P(z_t|x_{t,i})$, $$\lambda = \left(\prod_{i=1}^{m} P(z_t|x_{t,i})\right)^{\frac{1}{m}} \quad (5)$$

Configuration-level Likelihood

The configuration-level likelihood of $s_t^j$ reflects how much of the observations are explained and at what expense. The configurations that cover much of the relevant observations (object set) with a minimum number of modeled objects are favored. The inventive method measures the configuration likelihood using a product of two terms: coverage $\gamma$ and efficiency $\zeta$. Coverage is the percentage of data covered by configuration and object models (a model-to-data measure), and efficiency is the percentage of models covered by the data (a data-to-model measure). In the foreground blob example of FIGS. 5, 6 and 7, the percentage of the blob area 700 covered by modeled objects is measured. This measurement indicates how much of the observation is explained by the model. The coverage is formulated as:

$$\gamma = \frac{\left|A \cap \left(\bigcup_{i=1}^{m} B_i\right)\right| + b}{|A| + b} \quad (6)$$

where A is union of areas in foreground blobs 700, $B_i$ is the area covered by a tracked object i. Therefore, $\gamma$ is the percentage of the data covered by the model configuration, b is a small positive constant to avoid a divided-by-zero error. Such an error could occur if $|A|=0, \gamma=1$.

The efficiency of a configuration is defined as $$\xi = \frac{\left|A \cap \left(\bigcup_{i=1}^{m} B_i\right)\right| + c}{\left(\left|\bigcup_{i=1}^{m} B_i\right| + a\right)} \quad (7)$$

where $\alpha$ is a small positive constant for the same purpose as b and c is a positive number. As such, if too many objects are used to explain a small area, $\zeta$ will be small and when $|A|=0$, the configurations with smaller number of objects have higher score. The configuration-level likelihood is $\gamma\zeta$.

The overall likelihood of configuration $s_t^j$ is $$\pi_t^j = \lambda^\alpha \cdot (\lambda\zeta)^\beta \quad (8)$$

where positive constants $\alpha$ and $\beta$ control the overall convergence rate and relative importance of these two terms. As such, the invention favors configurations that cover the most blob area with the least number of models. The configurations are updated with each new video frame that is processed such that the configurations track the multiple objects from frame to frame in a video sequence.

Fast Algorithm

As mentioned previously, the above algorithm samples the a posteriori distribution of configuration in a high dimensional space $\bigcup_{m=0}^{k} X^m$. The algorithm takes a great number of samples and many iterations to converge to an optimal configuration. When insufficient samples are used, the process tends to be stalked by local maximums. An importance sampling technique alleviates this problem by reducing the size of parameter space X. A fast algorithm may be alternatively used to reduce the sampling space. The key idea behind this algorithm is to divide the sampling process into two stages, namely, local object-level sampling and global configuration-level sampling.

Figure 8:
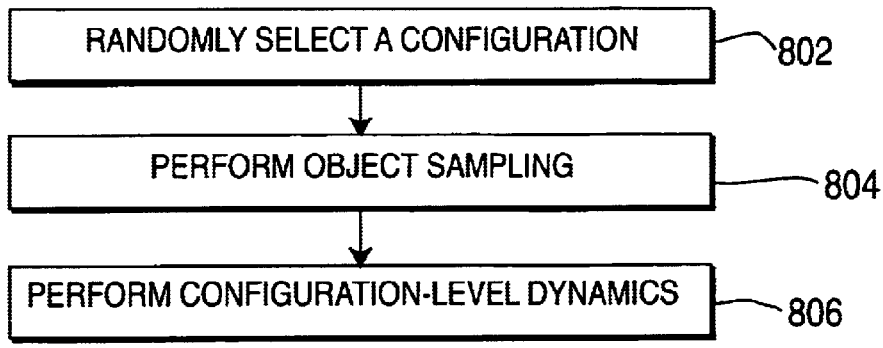
FIG. 8 depicts a flow diagram of a method representing a second embodiment of the invention.
Figure 9A:
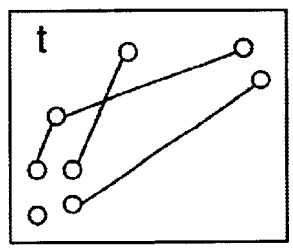
FIGS. 9A–D collectively depict the operation of the method of FIG. 8 upon a video frame having multiple objects.
Figure 9B:
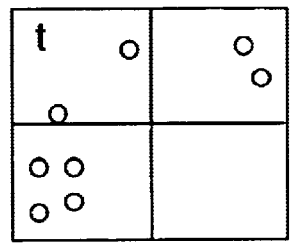
Figure 9C:
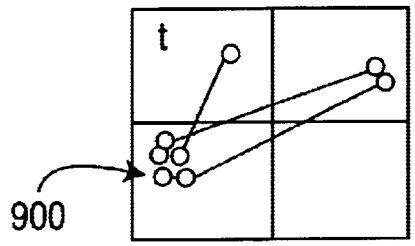
Figure 9D:
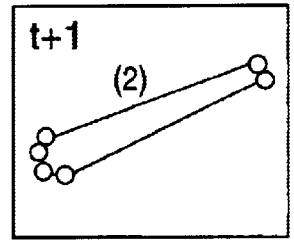

The alternative embodiment is depicted in FIG. 8 where the algorithm 800 starts by sampling from the configuration as accomplished in the method of FIG. 4. Specifically, the method 800 begins by selecting a configuration at step 802. Next at step 804, object-level sampling is performed. FIG. 9A illustrates the configuration selection. The image is first divided into smaller cells. Objects contained in all configuration samples are partitioned into these cells (FIG. 9B shows four cells). In each cell, several iterations of a CONDENSATION procedure are performed on objects in this cell. There is no notion of configuration in this process. As mentioned previously, this CONDENSATION procedure drives most of these object samples toward a spot 900 with local maximum likelihood as illustrated in FIG. 9C. To maintain correct object-level dynamics, in the first iteration, the transition matrix A is applied and Gaussian noise with smaller variance is used in all iterations to make it equivalent to the original Gaussian noise w. An issue in this step is for each configuration to track all of its objects. To handle this issue, the invention has each cell correlated with information regarding where it collects object samples. When the object-level CONDENSATION is performed, resulting samples are randomly chosen and assigned back to those configurations identified in the correlated information. In the next frame (t+1) as shown in FIG. 9D, the configuration with two objects is sampled twice due to its high likelihood.

In step 806, using the method 800, configuration-level dynamics are then performed for object addition and deletion. The parameters of each object remain unchanged. The likelihood of each configuration is then computed. Since the object parameters are not changed, the object-level likelihood computed in previous step is used to obtain a likelihood of a configuration, the invention only needs to compute the configuration-level likelihood as discussed above. When additions occur, the object-level likelihood of the new objects needs to be computed. Based on configuration-level likelihood, several iterations of sampling-dynamics-likelihood procedure are performed. Basically, the algorithm tries to find the MAP solution at the configuration level. Smaller deletion or addition rates should be used to maintain an overall deletion and addition rate between two frames.

Intuitively, the fast algorithm finds the local object-level optimal solution in finite number of cells. Then, the combinations of these local solutions are considered to derive the global optimum solution. This is an appropriate approach for multiple objects tracking algorithm. To see why this method is efficient, suppose the volume of X is D and there are m objects. Then the first embodiment of the invention needs to search in a space with volume $D^m$. The fast algorithm of the second embodiment divides D into N cells, the object-level search is still in a space with volume D. However, the dominant cost is the search in all the combinations of local solutions to get the global solution. The complexity of this operation is of the order of $N^m$. Compared to $D^m$, it is a much simpler problem.

The fast multiple object tracking algorithm is summarized as following:

Step 802. Randomly select, at time t>1, the jth configuration sample $s'_{t-1}{}^j$ from all $R_s$ samples $s_t-1$, i=1,2, ... $R_s$ in previous frame according to their corresponding likelihood $\pi_{t-1}{}^j$, i=1,2 ... $R_s$.

Step 804. Perform local object-level CONDENSATION: Partition 2D image space into small cells. In each cell, perform CONDENSATION for all object samples $x_{i1}$, i=0,1, ... ,k fall in this cell. The new object samples approach local object-level MAP solution.

Step 806. Perform global configuration-level posterior estimation: Configuration-level dynamics is performed to obtain $s_t{}^j$. The likelihood $\pi_t{}^j = P(z_t|s_t{}^k)$ is computed at configuration level based on locally improved object parameters. Then the configuration-level sampling-dynamics-likelihood process iterates several times to concentrate configuration around the global MAP solution.

Foreground blob is important for computing the configuration-level likelihood. Several methods for creating foreground blobs include background subtraction, two-image or three-image difference methods and the like.

Figure 10:
FIG. 10 depicts an object model of a person.
Figure 11:
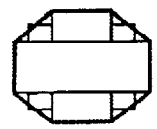
FIG. 11 depicts a spherical object model.

A crucial component in the proposed algorithms is the likelihood function of a configuration. It has two parts: the object-level likelihood function $P(z_t|x_{t,i})$ and the configuration-level likelihood based on coverage and efficiency ($\gamma$ and $\zeta$). A contour-plus-region representation is applied. For tracking people, the head-shoulder contour in FIG. 10 is compared with edge images to calculate $P(z_t|x_t,t)$. The regions are represented by rectangles and are used to compute $\gamma$ and $\zeta$. Spherical objects can be represented by a 2D contour region representation shown in FIG. 11.

To fully implement the invention, there are also several parameters that need to be decided. The size of cells in the illustrative embodiment implementation is 10×10 pixels. α and β, which controls the relative importance of object-level and configuration-level likelihood were both set to 1.0. The method of the present invention has been implemented on a Pentium II 400 MHz PC. The fast algorithm runs at 1 Hz when 200 configuration samples are used.

Although various embodiments which incorporate the teachings of the present invention have been shown and described in detail herein, those skilled in the art can readily devise many other varied embodiments that still incorporate these teachings.

What is claimed is:

1. A method for tracking multiple objects in a video sequence comprising:
   selecting an initial configuration comprising a plurality of objects, where the initial configuration represents an initial relationship among the objects in said plurality of objects;
   predicting a current configuration, where the current configuration represents a current relationship among the objects in said plurality of objects; and
   computing a likelihood for the current configuration.

2. The method of claim 1 wherein said predicting step comprises performing an object level prediction.

3. The method of claim 1 wherein said predicting step comprises performing a configuration level prediction.

4. The method of claim 3 wherein said configuration level prediction handles object addition and deletion from a current configuration.

5. The method of claim 1 wherein the predicting step comprises:
   determining a percentage of the objects that are covered by the current configuration;
   determining a number of current configurations that correspond to the objects; and
   maximizing said percentage and minimizing said number to identify an optimal current configuration.

6. The method of claim 5 wherein said percentage determining step comprises solving:

$$\gamma = \frac{\left|A \cap \left(\bigcup_{i=1}^{m} B_i\right)\right| + b}{|A| + b}.$$

7. The method of claim 5 wherein said percentage determining step comprises solving:

$$\xi = \frac{\left|A \cap \left(\bigcup_{i=1}^{m} B_i\right)\right| + c}{\left(\left|\bigcup_{i=1}^{m} B_i\right| + a\right)}.$$

8. The method of claim 1 wherein multiple objects in a video sequence are represented by said configuration comprising a plurality of modeled objects.

9. A method of producing probability distributions of states for multiple objects in a video sequence comprising:
  performing hierarchical sampling of at least one frame of video in said video sequence, wherein said sampling is performed in an object configuration and individual object states, said objected configuration representing a relationship among plurality of object within a scene; and
  repeating said sampling for each frame of video in said video sequence to track objects within the video sequence.

10. A computer readable medium containing a program that when executed by a processor, causes an image processing system to perform a method comprising:
  selecting an initial configuration comprising a plurality of objects, where the initial objects:
  predicting a current configuration, where the current configuration represents a current relationship among the objects in said plurality of object; and
  computing a likelihood for the current configuration.

11. The method of claim 10 wherein said predicting step comprises performing an object level prediction.

12. The method of claim 10 wherein said predicting step comprises performing a configuration level prediction.

13. The method of claim 12 wherein said configuration level prediction handles object addition and deletion from a current configuration.

14. The method of claim 10 wherein the predicting step comprises:
  determining a percentage of the objects that are covered by the current configuration;
  determining a number of current configurations that correspond to the objects;
  maximizing said percentage and minimizing said number to identify an optimal current configuration.

15. The method of claim 14 wherein said percentage determining step comprises solving:

$$\gamma = \frac{\left|A \cap \left(\bigcup_{i=1}^{m} B_i\right)\right| + b}{|A| + b}.$$

16. The method of claim 14 wherein said percentage determining step comprises solving:

$$\xi = \frac{\left|A \cap \left(\bigcup_{i=1}^{m} B_i\right)\right| + c}{\left(\left|\bigcup_{i=1}^{m} B_i\right| + a\right)}.$$

17. The method of claim 10 when wherein multiple objects in a video sequence are ion comprising a plurality of modeled objects.

* * * * *